3,772,248
POLYETHER/POLYARYLSULFONES

Harvey A. Brown, Lake Elmo, Herward A. Vogel, Oakdale, and Carl L. Sandberg, St. Paul, Minn., assignors to Minnesota Mining and Manufacturing Company, St. Paul, Minn.
No Drawing. Filed Oct. 30, 1972, Ser. No. 301,837
Int. Cl. C08g 5/02
U.S. Cl. 260—49                               2 Claims

ABSTRACT OF THE DISCLOSURE

Fluoroaliphatic-linked polyether/polyarylsulfones.

DETAILED DESCRIPTION

This invention relates to polyether/polyarylsulfones.

It is an object of this invention to provide certain novel fluoroaliphatic-linked polyether/polyarylsulfones.

It is another object of the invention to provide a class of thermoplastic, substantially linear fluoroaliphatic-linked polyether/polyarylsulfones.

It is another object of the invention to provide a class of soluble polymers having film forming properties.

It is another object of the invention to provide a process for the preparation of the polymers of the invention.

It is a still further object of the invention to provide a class of fluoroaliphatic-bridged aromatic compounds useful in the preparation of the copolymers of the present invention.

Still other objects of the invention wll become apparent to those skilled in the art from reading this specification.

The polyether/polyarylsulfones of this invention have repeating units of the formula $$\{\varnothing AR_f A\varnothing SO_2 \varnothing Z \varnothing SO_2\}$$

wherein A is $(O\varnothing)_m B$, —B is —OCH$_2$—, a carbon-carbon bond,

$R_f$ is —(CF$_2$)$_n$— or $\{(CF_2)_p O (CF_2)_p\}_r$, Z is —O— or —OCH$_2$R$_f$CH$_2$O—, $\varnothing$ is

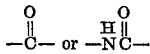—(para phenylene)

m is 0 or 1, n is 1 to 8, each p is 2 to 4 (individually) and r is 1 to 3. The terminal groups of the polymers are selected from H and halogen.

The polymers are formed by the Friedel-Crafts-catalyzed condensation of an aryl endcapped fluoroaliphatic compound of the formula H$\varnothing$AR$_f$A$\varnothing$H with an aromatic disulfonyl halide of the formula XSO$_2$$\varnothing$Z$\varnothing$SO$_2$X (wherein X is preferably a middle halogen having an atomic weight in the range of 35 to 80, i.e. chlorine or bromine), one molecule of HX being eliminated and a sulfonyl group becoming bonded to an aromatic ring in each unit reaction. The end groups of the polymers are H when the terminal unit of a polymer chain is —$\varnothing$AR$_f$A$\varnothing$— and X when the terminal unit is —SO$_2$$\varnothing$Z$\varnothing$SO$_2$—. Thus the terminal groups (of which there are two in the linear polymers and three or more in the branched or crosslinked polymers) can be the same or of both of these two types, depending upon the particular terminal units.

Each aromatic ring in the reactant H$\varnothing$AR$_f$A$\varnothing$H which has not been deactivated by substitution by a meta directing group (such as sulfonyl or carbonyl), is capable of undergoing such a unit reaction. Thus, depending upon their structures, these compounds can undergo from two to four unit reactions with the bireactive compounds XSO$_2$$\varnothing$Z$\varnothing$SO$_2$X. In this way branching and crosslinking can be introduced into the polymers. Branching and crosslinking can also be introduced by the addition of other compounds containing more than two rings which are not deactivated or more than two aromatic ring-bonded sulfonyl halide groups.

Preferably the reactants H$\varnothing$AR$_f$A$\varnothing$H contain only two rings capable of undergoing the unit reaction since they lead to linear, soluble, thermoplastic polymers.

The glass temperatures ($T_g$) of the polymers of the invention vary widely, e.g. from below room temperature to 210° C. or higher. Generally those polymers containing relatively long fluoroaliphatic bridging groups have lower $T_g$'s. The polymers are relatively resistant to degradation at high temperatures, generally showing 10% weight loss in air, as measured by thermogravimetric analysis (TGA) only at 340° C. or above (while heating at 10° C. per minute).

The linear polymers of the invention generally have inherent viscosities of not less than about 0.2 (when measured as 1% solutions in dimethylformamide at 25° C.) and they are soluble in concentrations up to 10% in phenol at 175° C., which indicates their substantially linear non-crosslinked nature. Generally, they are also soluble in such polar solvents as acetone, N-methylpyrrolidinone, N,N' - dimethylformamide, dimethylsulfoxide, pyridine, etc., which are well suited for casting and the spinning of fibers.

The linear polymer have uses in numerous areas of application. They can be molded, extruded, drawn, oriented and/or otherwise formed into articles including three dimensional shapes, films and filaments by conventional methods used to shape thermoplastic resins without serious degradation; and the articles thus produced have useful strength, toughness, flexibility and good appearance. They can be used as glass fiber and cloth laminants, and as adhesives or coatings to impregnate the surfaces of various other materials and/or to form surface films thereon. They are useful as wire coatings, tubes, pipes, sheets and the like and they can be filled using particulate or fibrous fillers. They are particularly useful as electrical insulating materials and particularly where corrosive and severe (high temperature) ambient conditions are found. They retain their dielectric properties at high temperatures and are suitable, for example, to insulate wire used in transformers or as capacitor dielectric separators.

The branched and crosslinked polymers of the invention can be formed (before, or in some cases, after branching or crosslinking) into three dimensional shapes which are also useful as dielectrics. Also, in pulverulent form, they can be used to fill the linear polymers of the invention or other similar materials, such filled materials also being useful as dielectrics.

As noted previously, the process for producing the polymers in accordance with the invention consists in the condensation of monomers containing sulfonyl halide (sulfonyl chloride or sulfonyl bromide) groups with other monomers containing aryl nuclei in the presence of certain catalysts. The reaction is illustrated by the following equation:

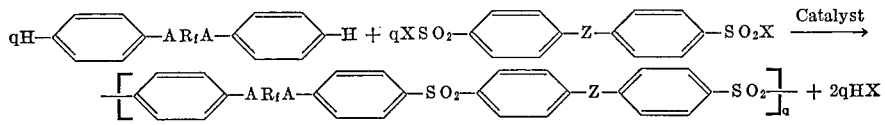

wherein A, $R_f$, X and Z are as previously defined and $q$ is an integer. In the case of the higher molecular weight polymers, $q$ is from about 10 to 100 or more.

The deactivating effect of the sulfonyl group on the aromatic ring to which it is or becomes attached is sufficient to prevent reaction of additional sulfonyl halide groups with the same ring. Thus, branching and crosslinking can be effectively suppressed by appropriate selection of monomers. Furthermore, the para position of the aromatic rings is considerably more reactive with respect to the sulfonyl halide group than the other positions of the rings in the monomeric materials. Thus, the aromatic rings appearing in the polymers of the invention are substantially completely para oriented.

The polymerization process is carried out utilizing either melt condensation or solution condensation procedures and is preferably carried out under inert conditions, e.g. under a nitrogen atmosphere. To effect the polycondensation the monomers or comonomers are first heated (generally in the presence of an inert solvent) to a temperature sufficient to obtain a uniform melt. Commonly this is achieved at temperatures ranging from 100 to 200° C. although temperatures ranging from about 25° to 250° may be used. The condensation catalyst is then added and the mixture is maintained at a temperature in the range of from about 100 to 250° C. for from about 1 hour to 48 hours or more, to complete the polymerization. The purpose of the inert solvent is to increase the fluidity of the reaction mixture. Suitable solvents include chlorinated aliphatic and aromatic hydrocarbons, e.g. s-tetrachloroethane, methylene chloride, and Arochlors (highly chlorinated biphenyl and diphenyl ethers), etc.; aliphatic and aromatic sulfones such as dimethylsulfone, tetramethylenesulfone, p,p'-dichlorodiphenylsulfone, etc.; or aliphatic and aromatic nitro compounds such as 1-nitropropane, 3,4'-dichloronitrobenzene, etc. The preferred solvent is (dry) nitrobenzene.

Effective condensation catalysts are anhydrous Lewis acids, also known as Friedel-Crafts catalysts, such as ferric chloride, indium trichloride, aluminum chloride, zinc chloride, the chlorides of antimony, molybdenum, gallium, etc. Anhydrous hydrofluoric acid or trifluoromethanesulfonic acid may also be used as catalysts. The particularly preferred catalysts are iron and indium chlorides. The preferred catalysts are generally found to be effective in amounts of from about 0.05 to about 0.5 mole per mole of reactive sulfonyl halide group present. Greater proportions of catalysts may be utilized but this is generally unnecessary and is ordinarily avoided, since larger amounts can adversely affect the degree of polymerization, and the separation of the catalyst from the polymer may prove difficult.

The following examples are intended to illustrate the present invention but no limitations as to the scope of the invention are implied thereby. All parts are by weight therein unless otherwise specified. The inherent viscosities of the polymers are measured as 1 percent solutions (w./v.) in dimethylformamide at 25° C. and the glass transition temperatures ($T_g$) are determined by differential thermal analysis (DTA). The resistances of the polymers to degradation at high temperatures are measured by thermogravimetric analysis (TGA), i.e. by continuously measuring the loss of weight of a sample of the polymer while heating it in air at a rate of 10° C. per minute from ambient temperature.

THE INTERMEDIATES

The following intermediates (A–J) are known to the art:

| Designation | Structure |
|---|---|
| A | 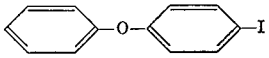 |
| B | $I(CF_2)_4I$ |
| C | 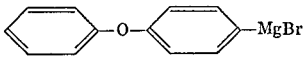 |
| D | $HOCH_2(CF_2)_4CF_2OH$ |
| E | $HOCH_2(CF_2)_3CH_2OH$ |
| F | $HOCH_2(CF_2)_2O(CF_2)_2O(CF_2)_2CH_2OH$ |
| G | $HOCH_2(CF_2)_2O(CF_2)_4O(CF_2)_2CH_2OH$ |
| H | $HO\overset{O}{\overset{\|}{C}}(CF_2)_2O(CF_2)_2\overset{O}{\overset{\|}{C}}OH$ |
| I | 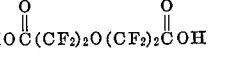 |
| J | 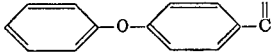 |

The preparation of intermediates K–W (structures set out in the following table) are given below in detail:

| Designation | Structure |
|---|---|
| K | 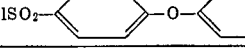 |
| L | 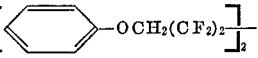 |
| M | 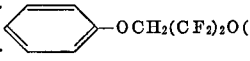 |
| N | 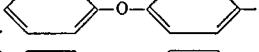 |
| O |  |
| P |  |
| Q |  |
| R | 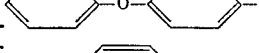 |
| S | 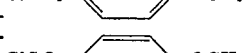 |
| T | 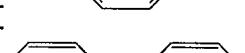 |
| U | 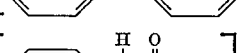 |
| V | 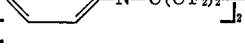 |
| W | 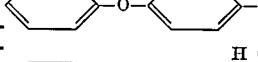 |

K

Trifluoromethanesulfonyl fluoride (119.1 g., 0.785 m.) was condensed into a Dry-Ice/acetone cooled flask. To the sulfonyl fluoride was then slowly added a solution of 109.0 g. (0.392 m.) of $HOCH_2(CF_2)_2O(CF_2)_2CH_2OH$ and 79.3 g. (0.785 m.) of triethylamine in 150 ml. of methylene chloride. On completion of the addition, the mixture was stirred for about 1.5 hours while warming to room temperature and then at room temperature for 30 minutes. The methylene chloride solution was then washed with dilute HCl, dilute NaOH and water and was finally dried over Drierite. After removing the solvent, the residual oil was distilled giving 175 g. of product, B.P. 69–74°/~0.5 mm. (mainly 72–74°), 83% yield. The infrared spectrum of this compound was consistent with the structure $CF_3SO_2OCH_2(CF_2)_2O(CF_2)_2CH_2OSO_2CF_3$.

*Analysis.*—Calculated (percent): C, 17.72; H, 0.74; F, 49.06. Found (percent): C, 17.9; H, 0.8; F, 49.2.

Sodium phenoxide was prepared from 86.5 g. (0.92 m.) of phenol and 29.2 g. (0.73 m.) of sodium hydroxide in methanol. After removing the solvent and drying the salt, it was dissolved in 175 ml. of DMF (dimethylformamide). To this solution was slowly added 99.5 g. (0.23 m.) of the above trifluoromethanesulfonate ester. The reaction was exothermic. After all the ester had been added, the reaction mixture was heated on a steam bath for one hour, then poured into 500 ml. of cold water. The lower oily layer was separated and the water layer was extracted with 150 ml. of ether. The oil and ether extracts were combined, washed with water several times, dried over Drierite and then evaporated to remove the solvent. The oily product was heated under vacuum on the steam bath at about 5 mm. pressure. The remaining product (71.6 g.) was then fractionated giving 39.1 g., B.P. 134–161°/~1 mm. The infrared spectrum of this product was consistent with the structure of compound K.

L

Following the procedure described above, the trifluoromethanesulfonate ester, $$CF_3SO_2OCH_2(CF_2)_2O(CF_2)_4O(CF_2)_2CH_2OSO_2CF_3$$

was reacted with sodium phenoxide in DMF to give the diether (compound L).

Analysis for $$CF_3SO_2OCH_2(CF_2)_2O(CF_2)_4O(CF_2)_2CH_2OSO_2CF_3$$

Calculated (percent): C, 19.00; H, 0.53; F, 55.12. Found (percent); C, 19.1; H, 0.5; F, 55.2.

Analysis for

Calculated (percent): C, 40.9; H, 2.2; F, 47.0. Found (percent): C, 40.9; H, 2.1; F, 47.1.

M

A mixture of 50.4 g. (0.17 m.) of 4-iododiphenyl ether, 38.4 g. (0.085 m.) of 1,4-diiodoperfluorobutane and 21.6 g. of activated copper powder in 250 ml. of dry dimethyl sulfoxide was heated at 90° for 42 hours while being vigorously stirred. The reaction mixture was then cooled and an orange precipitate was filtered off, 40.2 g. (copper iodides, etc.). The filtrate was distilled under vacuum to remove the solvent and unreacted fluorocarbon diiodide. During this time additional insoluble inorganic material formed which was removed by adding ether to the residue and filtering. Evaporation of the ether from the filtrate gave a waxy residue which upon crystallizing from hexane gave a material M.P. 118–127° (mainly 124–127°). Recrystallization from chloroform gave 4.5 g. of small plates, M.P. 126–128°. Infrared analysis was consistent for the proposed structure of $F^{19}$ N.M.R. analysis gave the following values:

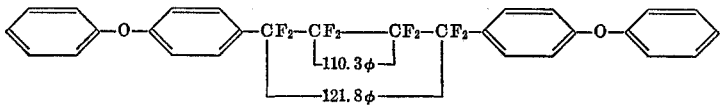

*Analysis.*—Calculated for $C_{28}H_{28}F_8O_2$ (percent): C, 62.5; H, 3.36; F, 28.2. Found (percent): C, 61.4; H, 3.6; F, 27.8.

N

To 30.4 g. (0.2 m.) of trifluoromethane sulfonyl fluoride cooled in a Dry-Ice/acetone bath was added slowly a mixture of 26.2 g. (0.1 m.) of octafluorohexanediol $[HOCH_2(CF_2)_4OH]$ and 20.2 g. (0.2 m.) of triethylamine in 100 ml. of methylene chloride. The mixture was then allowed to warm to room temperature and stand two hours. Next the reaction mixture was washed with 5% HCl, water and dried over Drierite. Upon evaporating the solvent, a white crystalline solid formed, M.P. 50–53°. Recrystallization from cold methylene chloride gave 45.7 g. of the product, $CF_3SO_2OCH_2(CF_2)_4CH_2OSO_2CF_3$, M.P. 53–54°. From the mother liquor was obtained an additional 3.1 g. M.P. 51–54°.

The potassium salt of 4-hydroxy diphenyl ether was prepared by reacting the phenol with KOH in methanol. The dried potassium salt, 22.4 g. (0.1 m.) was dissolved in 100 ml. of warm dimethyl sulfoxide then 26.3 g. (0.05 m.) of $CF_3SO_2OCH_2(CF_2)_4CH_2OSO_2CF_3$ in 50 ml. of dimethyl sulfoxide was added. The reaction mixture was heated 4 hours on the steam bath then poured over cracked ice. A light brown solid was filtered off, dissolved in ether, washed 3 times with 5% KOH solution, water then dried over Drierite. After evaporating the solvent, the residue was extracted with petroleum ether and the product crystallized on cooling. The first crop melted at 59–61°, 15.2 g.

*Analysis.*—Calculated (percent): C, 60.2; H, 3.70; F, 25.39. Found (percent): C, 60.2; H, 3.8; F, 25.3.

A second crop, M.P. 59–61.5°, 4.2 g. was also obtained from the above mother liquor.

O

The compound $CF_3SO_2OCH_2(CF_2)_3CH_2OSO_2CF_3$ was pepared from hexafluoropentadiol and trifluoromethane sulfonyl fluoride by the procedure described above. The compound is a liquid, B.P. 80–82°/1.5 mm.

Compound O was prepared from the trifluoromethane sulfonate ester and the sodium salt of phenol following the same procedure as described above for the preparation of compound N. The pure compound was obtained by recrystallization from ether as pale yellow plates, M.P. 82–83.5°.

*Analyis.*—Calculated (percent): C, 56.0; H, 3.9; F, 31.3. Found (percent): C, 56.1; H, 3.9; F, 31.3.

P

Diphenyl ether [59.6 g., 0.35 m. (50% excess)] was dissolved in 200 ml. of dry 1,1,2,2-tetrachloroethane and, after cooling to about 15°, 62.0 g. (0.462 m.) of aluminum chloride was added. Then, to the resulting deep red solution, was added slowly over a period of two hours 95 g. (0.231 m.) of 4 - (4-phenoxybenzoyl)perfluorobutyryl chloride, maintaining a temperature of 25–30° throughout the addition. During the acid chloride addition the reaction mixture first assumed a deep blue and then later a deep emerald color. After stirring overnight the reaction mixture was heated gently at 30–40° for ½ hour, and was then hydrolyzed by pouring over one liter of cracked ice and 100 ml. conc. HCl. The organic layer was diluted with ether, dried over Drierite, and finally stripped of solvent under vacuum on a steam bath. The remaining viscous residue did not solidify on standing, therefore the excess diphenyl ether was removed by steam distillation. The oily residue, on standing, again did not solidify and did not crystallize from several solvents tried. Infrared analysis indicated that this was the desired product, compound P.

A sample (3.0 g.) was purified by column chromatography, using 50 g. of a neutral alumina (act. II). The first fraction collected (2.25 g.), employing benzene (50 ml.) as an elutant, was submited for analysis. The $F^{19}$ N.M.R. analysis agreed with the proposed structure,

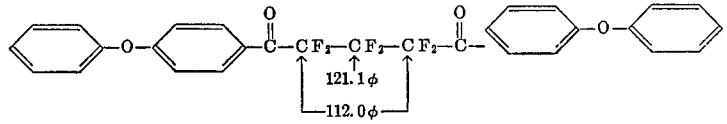

*Analysis.*—Calculated (percent): C, 64.0; H, 3.33; F, 20.9. Found (percent): C, 64.7; H, 3.5; F, 20.2.

Q

This compound was prepared using the following reaction scheme.

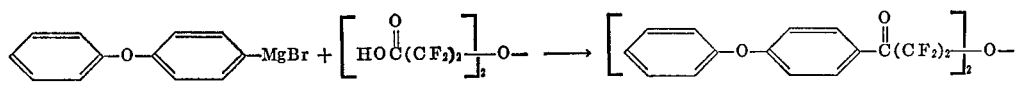

The product was distilled under reduced pressure and a fraction was collected which was confirmed by I.R. analysis to be the desired diketone. A sample was purified by chromatography.

Calculated (percent): C, 59.0; H, 3.0; F, 24.9. Found (percent): C, 59.2; H, 3.2; F, 24.1.

R

Twenty grams (0.0465 m.) of

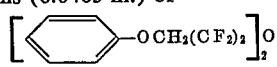

was dissolved in 150 ml. of chloroform. The solution was cooled in an ice bath and 54.2 g. (0.465 m., 400% excess) of chlorosulfonic acid was added dropwise. The reaction mixture was then warmed gently on a steam bath for 10 minutes and stirred at room temperature for 2 hours. The solution was cautiously poured over cracked ice and the organic layer was separated, washed with $NaHCO_3$, water and finally dried over Drierite. Evaporation of the solvent gave a white solid which was recrystallized from cyclohexane/ether to give 23.7 g. of fine white needles, M.P. 79–82°. A second recrystallization from cyclohexane/chloroform gave 22.0 g. of the desired product, compound R, M.P. 79–81°. The infrared spectrum of this product was consistent with the desired structure.

S

Following the same procedure as above, the subject disulfonyl chloride was prepared from

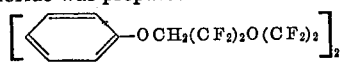

and chlorosulfonic acid. The product was recrystallized from cyclohexane/chloroform, M.P. 64–66°. The infrared spectrum of this product was consistent with the desired structure.

T–W

The fluorocarbon-aromatic amides T–W were prepared by reacting a fluorocarbon diacyl fluoride (or chloride) with an aromatic amine as follows:

| Compound | Process |
|---|---|
| T | ⌬–O–⌬–NH₂ + (XĊCF₂)₂CF₂ |
| U | ⌬–NH₂ + [XĊ(CF₂)₂]₂–O |
| V | ⌬–O–⌬–NH₂ + [XĊ(CF₂)₂]₂–O |
| W | ⌬–O–⌬–NH₂ + [XĊ(CF₂)₂O(CF₂)₂]₂ |

In these reactions an excess of the aromatic amine or a tertiary amine (triethylamine) was employed as an acid acceptor. The characterizations of the compounds were as follows:

| Compound | Mol. weight | M.P.,° C. | Calc. C | Calc. H | Calc. F | Calc. N | Found C | Found H | Found F | Found N |
|---|---|---|---|---|---|---|---|---|---|---|
| T | 574.48 | 206.5–208.5 | | | | | | | | |
| U | 456.30 | 148–149.5 | 47.38 | 2.65 | 33.31 | 6.14 | 47.3 | 2.6 | 33.1 | 6.3 |
| V | 640.5 | 144–145 | 56.25 | 3.15 | 23.73 | | 55.9 | 3.1 | 23.4 | |
| W | 856.54 | 128.5–129.5 | 47.67 | 2.35 | 35.49 | 3.27 | 47.5 | 2.3 | 35.1 | 3.2 |

THE POLYMERS

Example 1

The reaction of Compounds J and K.—Disulfonyl chloride J (3.6723 g., 0.01 m.) and diether K (4.3030 g., 0.01 m.) were dissolved in 8 ml. of nitrobenzene under nitrogen. The reaction mixture was heated to about 125° and 1 ml. of a 10% solution of anhydrous ferric chloride in nitrobenzene was added. A vigorous evolution of HCl was observed at once. Stirring and heating were continued for 21 hours. The product was cooled and was dissolved in 12 ml. of acetone. The polymer was then precipitated in methanol. A second reprecipitation from methanol and vacuum drying at 80° gave a brittle thermoplastic with a $T_g$ of 109°. TGA in air showed a 10% weight loss at about 430°.

Example 2

The reaction of Compounds J and L.—Following the same procedure as in Example 1 a similar thermoplastic was obtained. The glass transition temperature ($T_g$) was found to be about 74° and TGA in air indicated a 10% weight loss at about 420°.

Example 3

The reaction of Compounds J and N.—To a heated (125°) mixture of 5.9850 g. (0.01 m.) of the fluorocarbon-bridged aromatic ether N and 3.6723 g. (0.01 m.) of 4,4'-diphenylether disulfonyl chloride (J) dissolved in 10 ml. of nitrobenzene under nitrogen was added 1 ml. of a 10% solution of anhydrous ferric chloride in nitrobenzene. Immediately a vigorous evolution of HCl was noted. After about 30 min. the reaction mixture was extremely viscous and had "balled-up" around the stirring blade. Heating was continued for 2 hours, after which the mixture was cooled and 30 ml. of acetone was added. The reaction product was insoluble in acetone and also in dimethylformamide, indicating crosslinking. After leaching out the solvents with methanol and vacuum drying, the polymer was found to have a $T_g$ of 110–125°. The TGA in air showed a 10% weight loss at about 380°.

Example 4

The reaction of Compounds J and O.—The reaction was carried out following the same procedure as in Example 3. The reaction product (after 3 hours of heating at 125°) was soluble in acetone. The polymer was precipitated in methanol and vacuum dried. The inherent viscosity (1% in DMF) was found to be 0.29 and the $T_g$ was 134–148°. TGA in air indicated a 10% weight loss at about 445°. Films formed either by spin drying acetone solutions or hot pressing were relatively brittle.

Example 5

The reaction of Compounds L and R.—The diether (Compound L, 4.8475 g., 0.0075 m.) and the disulfonyl chloride (Compound R, 4.7048 g., 0.0075 m.) were dissolved in 10 ml. of nitrobenzene. The solution was heated under nitrogen to 125° and one ml. of a 10% solution of ferric chloride in nitrobenzene was added. A vigorous evolution of HCl occurred immediately but gradually diminished as the reaction proceeded. After 23 hours at about 125° the reaction mixture was cooled, acetone was added to dilute the solution and the polymer was precipitated in rapidly stirred methanol. After vacuum drying at 100° overnight, the polymer was found to have a $T_g$ of 45–55°. TGA in air showed a weight loss of 10% at about 410°. Films prepared by hot pressing were relatively brittle.

Example 6

The reaction of Compounds L and S.—To a solution of 4.7441 g. (0.00743 m.) of the diether (Compound L) and 6.253 g. (0.00771 m.) of the disulfonyl chloride (Compound S) (assuming 95% purity) in 11 ml. of nitrobenzene under nitrogen at about 130° was added 1 ml. of 10% anhydrous ferric chloride in nitrobenzene. Immediately a vigorous evolution of HCl was observed and gradually the viscosity of the solution increased. After 18.5 hours at 130° the viscosity had increased to the point where the polymer solution was "balled-up" around the stirring blade. After cooling, 20 ml. of acetone was added and the polymer was precipitated by pouring the solution into rapidly stirred methanol. The finely divided polymer was once more washed (leached) with methanol and then dried overnight at 90° in a vacuum oven.

The following data were obtained: Inherent viscosity 0.23; films pressed at 350° F. were tough, leathery thermoplastics; the $T_g$ was 37–42°; and TGA showed a 10% weight loss in air at 410°. Samples of the above polymer hot pressed at 350° F. gave the following tensile strength data: At room temperature: 2500 p.s.i., elongation less than 1%; oriented sample at room temperature: 4200 p.s.i., elongation less than 1%. At temperatures above the $T_g$, the polymer exhibited properties characteristic of elastomers. For example, at 50° C. the tensile was 1200 p.s.i. and the elongation was about 800%.

Example 7

The reaction of Compounds J and M.—A 100 3-necked flask fitted with nitrogen inlet and outlet and mechanical stirrer was charged with 5.38 g. of Compound J and 9 g. of dry nitrobenzene. The mixture was heated to 120° under a slow purge of nitrogen gas with moderate stirring. After a uniform solution was obtained, about 50 mg. of anhydrous indium trichloride was added. The solution turned dark purple and evolution of HCl gas started. Heating and stirring were continued at 130° for 8 hours. The viscous product was then diluted with dimethylformamide to a 20% solids solution and the polymer recovered by precipitation into methanol in a blender and filtration. The polymer was extracted twice with hot methanol, once with dilute HCl, once with dilute (2%) sodium hydroxide, washed with water and finally dried under vacuum at 100°. The polymer showed an inherent viscosity of 0.58 and a $T_g$ of 160–170° C. Thermogravimetric analysis indicates a 10% weight loss in air at about 440° C.

Example 8

The reaction of Compounds J and P.—A mixture of 5.44 g. (0.01 m.) of Compound P, 3.67 g. (0.01 m.) of Compound J and 8.5 g. of dry nitrobenzene was placed in a 3-neck flask fitted with stirrer and nitrogen inlet and outlet. The mixture was heated under a slow purge of nitrogen to 120° C. and 100 mg. anhydrous indium trichloride was added. After one hour heating at 130° C., an additional 500 mg. anhydrous ferric chloride catalyst was added. Heating and stirring were continued for 48 hours. A thick, rubbery mass was obtained which was diluted with dimethylformamide and then precipitated into methanol using a high speed blender. The precipitated polymer was filtered off and extracted once in boiling methanol, once in dilute hydrochloric acid and then dried. The polymer had an inherent viscosity of 0.29. The infrared spectrum showed the expected aromatic sulfone ether and carbonyl bands. DTA analysis indicated a $T_g$ of 145–155° for the polymer. By fractional precipitation of a 5% solution in DMF with methanol, a high cut was separated which could be cast into a tough film from DMF solution. The inherent viscosity of this polymer was 0.40. The TGA in air indicated a 10% weight loss at about 490° C.

Example 9

The reaction of Compounds J and Q.—A mixture of 6.10 g. (0.01 m.) of Compound Q and 3.67 g. (0.01 m.) of Compound J was melted under nitrogen atmosphere at 160° C. and 100 mg. of anhydrous $InCl_3$ was added. The temperature was increased to 190° over a three hour period and a viscous, foamy mass was obtained, having an inherent viscosity of 0.16. After an additional hour of heating at 190° C. the inherent viscosity was 0.24. The polymer was dissolved in N-methyl pyrrolidone and cast into a film. A brownish, relatively brittle film was obtained after drying for several hours at 200° C. The infrared curve supported the expected polymer structure. Differential thermal analysis indicated a $T_g$ of 63–87° C. for the polymer.

Example 10

The reaction of Compounds J and W.—To a solution of 3.6723 g. (0.01 m.) of Compound J and 8.5654 g. (0.01 m.) of Compound W in 12 ml. of dry nitrobenzene heated to 125° C. under nitrogen for 15 minutes was added one ml. of a 10% solution of anhydrous $FeCl_3$ in nitrobenzene. An initial vigorous evolution of HCl occurred. The heating at about 125° C. was continued with stirring for 2 hours during which time the mixture became very viscous and the HCl evolution ceased. Twenty-five ml. of acetone was then added to the reaction mixture and the polymer was precipitated in vigorously stirred methanol. After vacuum drying overnight at 125° C. the following data were obtained: The infrared spectrum was consistent with the proposed structure. Fairly tough films were prepared by spin casting (5% acetone solution) and by hot pressing at 325° F. The inherent viscosity of the polymer was 0.67 and the $T_g$ was 87–100° C. TGA indicated a 10% weight loss in air at about 340° C.

Example 11

The polysulfone-amides listed in the following table were prepared by reacting the indicated intermediate compounds utilizing the procedure of Example 10. The data characterizing the resulting linear polymers is also included in the table.

| Intermediates | $T_g$, °C; polymer | TGA, 10% wt. loss in air, °C | Remarks |
|---|---|---|---|
| J and T | 195–204 | 345 | |
| J and U | 173–180 | 385 | Tough film by spin casting. |
| J and V | 120–136 | 355 | Films hot pressed at 350° F. |

What is claimed is:

1. Fluoroaliphatic - linked polyether/polyarylsulfones having repeating units of the formula

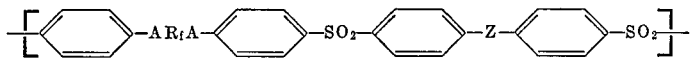

where A is

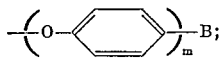

B is —OCH$_2$—, a carbon-carbon bond,

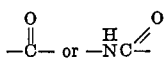

R$_f$ is $+CF_2)_n$ or $+(CF_2)_pO+CF_2)_p]_r$, Z is —O— or

—OCH$_2$R$_f$CH$_2$O—

$m$ is 0 or 1, $n$ is 1 to 8, each $p$ is 2 to 4 and $r$ is 1 to 3 and terminal groups selected from H and halogen of atomic weight in the range of 35 to 80 said polymers having inherent viscosities of not less than about 0.2 when measured as 1 percent solutions in dimethylformamide at 25° C.

2. A thermoplastic, substantially linear polymer according to claim 1.

References Cited

UNITED STATES PATENTS 3,505,411    4/1970    Rice      260—615

DONALD E. CZAJA, Primary Examiner

M. I. MARQUIS, Assistant Examiner

U.S. Cl. X.R.

117—161 R; 260—47 R, 79, 79.3 R, 79.3 M